United States Patent [19]
Kurtz et al.

[11] Patent Number: 5,476,350
[45] Date of Patent: Dec. 19, 1995

[54] SLOTTED PUSH-IN RIVET AND METHOD OF RIVETING

[75] Inventors: John F. Kurtz, Mendham, N.J.; Stephen Getten, Albrightsville, Pa.; Carlos Casteneda, Dover, N.J.

[73] Assignee: Avdel Corporation - Systems Division, Parsippany, N.J.

[21] Appl. No.: 142,005

[22] Filed: Oct. 28, 1993

[51] Int. Cl.⁶ .............................. F16B 13/06; F16B 19/00
[52] U.S. Cl. ............................ 411/60; 411/69; 411/508; 411/913
[58] Field of Search .................... 411/60, 61, 69, 411/508, 509, 913

[56] References Cited

U.S. PATENT DOCUMENTS

| | | |
|---|---|---|
| 3,055,255 | 3/1958 | Burrell et al. |
| 3,217,584 | 11/1965 | Amesbury ............................. 411/508 |
| 3,557,597 | 9/1967 | Heslop et al. |
| 4,865,555 | 9/1989 | Assini et al. ......................... 411/508 X |
| 5,083,926 | 1/1992 | Kissinger et al. .................. 411/509 X |
| 5,271,588 | 12/1993 | Doyle .................................. 411/508 X |

Primary Examiner—Neill R. Wilson
Attorney, Agent, or Firm—Oblon, Spivak, McClelland, Maier & Neustadt

[57] ABSTRACT

A push-in rivet for being mounted on and interconnecting a connector and a circuit board. The rivet body includes a head portion, a plurality of spaced-apart flexible legs, and a shank portion which interconnects the head portion and the legs. The legs are flexible and are subsequently radially inwardly movable for passage through a hole formed in the board and radially outwardly movable after passage through the hole so as to interconnect the connector and the board. The method of riveting the connector to the board includes the steps of passing the rivet through a hole in the connector so that the head portion abuts a surface of the connector, drawing a mandrel through the bore so as to outwardly expand the legs, and passing the legs of the rivet through a hole in the board so as to radially inwardly compress the legs for passing through the hole in the board and subsequently radially outwardly expanding the legs so as to secure the board to the connector.

9 Claims, 2 Drawing Sheets

SLOTTED PUSH-IN RIVET AND METHOD OF RIVETING

BACKGROUND OF THE INVENTION

1. Field of the Invention

The present invention is directed to a slotted push-in rivet and a method of riveting using the push-in rivet for interconnecting a connector or parent material and a board such as a printed circuit board or other material. A special mandrel is passed through the bore of the rivet so as to expand slotted legs of the rivet which can thereafter be inserted in a hole in the printed circuit board. By completely extruding the mandrel through the uppermost counter bored portion of the rivet, the fastener is permanently secured to the parent or connector material.

2. Discussion of the Background

It is known presently to press a plated eyelet into a connector hole and then have a harpoon staking device constructed of a stamped and formed material inserted thereafter in a second operation. Applying pressure from both sides of the connector to press in existing parts, however, causes inconsistent cracking of the plastic area adjacent to the connector hole.

As part of the above-noted insertion and assembly process, flaking of plated parts is experienced when the harpoon is inserted into the eyelet. This flaking creates debris and is an unacceptable condition involving components used on printed circuit boards.

Known devices are also lacking with respect to connector stability on printed circuit boards. More particularly, designs of existing harpoon devices can cause wobbling or an inexact fit, especially if hole or harpoon tolerances do not match with design parameters.

SUMMARY OF THE INVENTION

An object of the present invention is to avoid the drawbacks noted hereinabove with respect to known devices and processes.

Through controlled expansion and broaching of the slotted push-in rivet of the present invention, it is possible to automatically place parts and eliminate cracking of thin plastic connector material. In addition, the use of a one-piece push-in rivet in accordance with the present invention placed under controlled expansion serves to eliminate any flaking of the corrosion protection which might otherwise occur. Moreover, by virtue of the design of the present invention, greater side wall stability of the rivet results, thus minimizing component wobble. It allows for a tighter fit which therefore results in higher clamp values between the connector and the printed circuit board.

The push-in rivet in accordance with the present invention can be utilized in conjunction with known riveting apparatuses such as, for example, that shown in U.S. Pat. No. 3,557,597. As a result of the present invention, a slotted push-in rivet is provided for being mounted on and for interconnecting a connector with a printed circuit board, the rivet including a rivet body having a head portion, a plurality of spaced-apart legs, and a shank portion which interconnects the head portion and the legs wherein the rivet body has a bore which extends through the head portion, between the legs, and through the shank portion, and wherein the legs are expandable upon passage of the mandrel through the bore.

In accordance with the method of the present invention, a method of riveting a connector to a printed circuit bore is provided which includes the steps of passing the rivet through a hole in the connector so that the head portion abuts a surface of the connector, drawing the mandrel through the bore, passing the legs of the rivet through a hole in the board and radially outwardly extending the legs so as to secure the board to the connector.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 5:
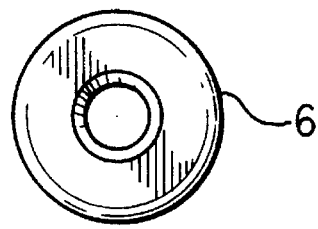
FIG. 5 is a top plan view.
Figure 1:
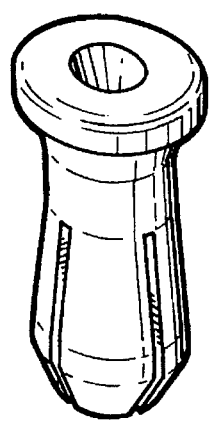
FIG. 1 is a top, front and left side perspective view of the push-in rivet in accordance with the present invention.
Figure 2:
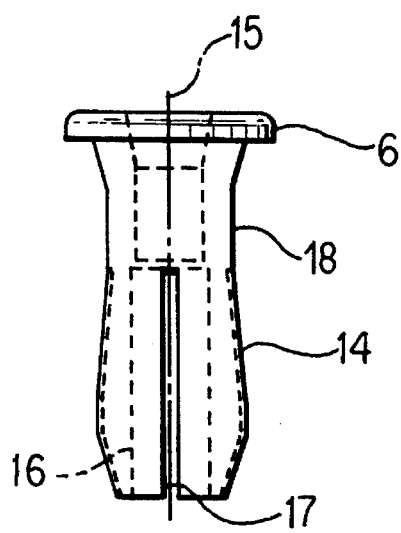
FIG. 2 is a front elevational view thereof, the rear view being a mirror image thereof.
Figure 3:
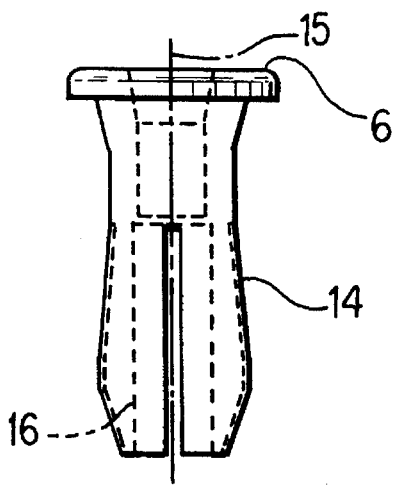
FIG. 3 is a left side elevational view thereof, the right side view being a mirror image thereof.
Figure 4:
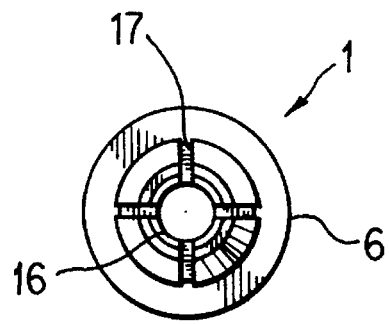
FIG. 4 is a bottom view.

FIGS. 1–5 show the rivet 1 of the present invention from different views. The rivet 1 has been designed primarily for the purpose of acting as a staking device for use in electronic component assembly. In a preferred embodiment, the device is to be permanently attached to a D-type connector or other electronic component connectors 2 that would be subsequently inserted into a printed circuit board (PCB) 12 or other material. In general, the rivet 1 can be used for other applications where it is permanently secured to a connector or parent material and used thereafter to mate or secure other materials in a joint. The rivet 1 is first installed by using speed fastening equipment, as exemplified by the riveting apparatus in U.S. Pat. No. 3,557,597, to secure it to the connector component 2. It is inserted into the connector hole 4 and expanded at the head portion 6, attaching it to the connector. Thereafter, the rivet can be manually or automatically inserted into an appropriately sized hole 10 of the PCB 12. The rivet has slotted legs 14 which are radially outwardly flared with respect to the longitudinal axis 15 of the rivet 1 to a maximum diameter and then inwardly tapered in the direction of the end of the legs. The slotted legs 14, as shown in the placing or mounting sequence shown in FIGS. 8–11, first collapse inwardly and then expand, due to the resilience of the legs, so as to secure the connector 2 to the PCB 12, preparing it for wave soldering operations thereafter. As shown in FIGS. 1–5, the rivet 1 has a longitudinal axis 15 and the plurality of spaced-apart legs 14 having slots 17 formed between each of the legs which extend the entire length of the legs, although this length dimension may be variable depending upon the thickness of the connector and the PCB. The rivet 1 also includes a bore 16 which extends between opposite legs, through a shank portion 18 and through the head portion 6 of the rivet.

Figures 6, 7, 8:
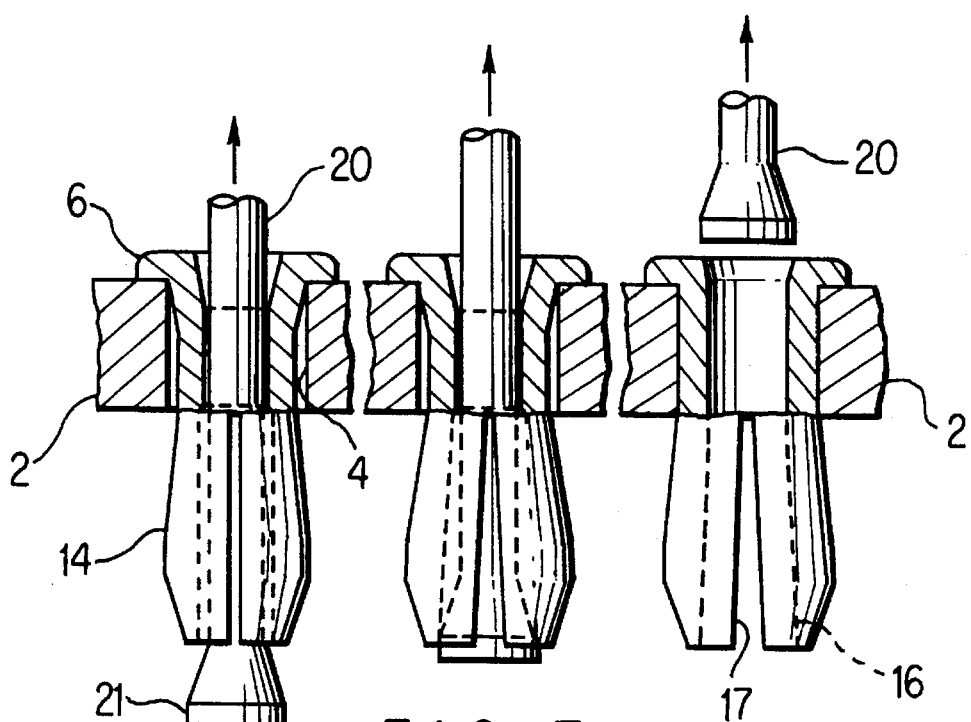
FIGS. 6, 7 and 8 show the push-in rivet during various stages of the placing sequence of the rivet on to the connector.

With respect to the placing sequence illustrated in FIGS. 6–8, it is to be noted that in FIG. 5, the rivet is shown threaded onto a speed fastening mandrel 20 which has an outwardly flared end portion 21. The rivet is placed into the connector or parent material hole 4. As indicated in FIGS. 5–8, in the placing sequence, the mandrel 20 and mandrel head 21, upon being drawn through the rivet, cause an outward flaring of the legs in a radially outward manner with respect to longitudinal axis 15 and also cause an outward expansion of the shank so as to be in tight fitting engagement with hole 4 of the connector 2. The legs 14 of the rivet are then ready for engagement with the PCB in the manner illustrated in the assembly sequence shown in FIGS. 9–11.

Figures 9, 10, 11:
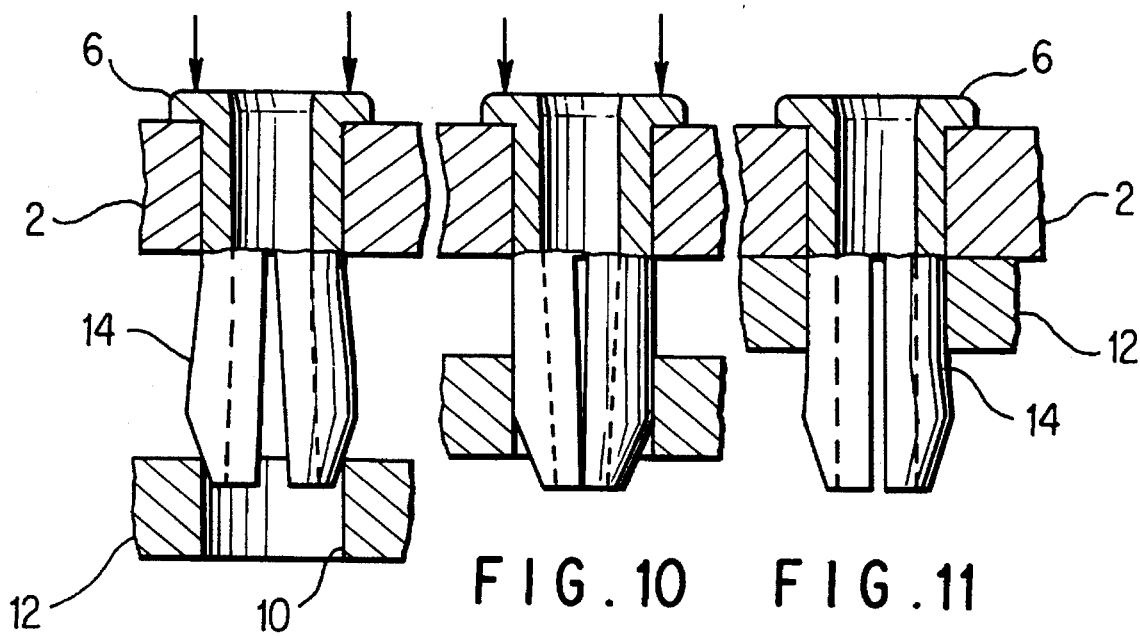
FIGS. 9, 10 and 11 show the assembling sequence of the push-in rivet for interconnecting the connector and the printed circuit board during the progressive stages.

In the assembly sequence, FIG. 9 shows the step wherein the slotted rivet is inserted into a hole 10 in the PCB 12. FIG. 10 shows that a downward insertion force on the rivet head, as shown by the arrows, presses the slotted portion of the rivet stake so as to enable the staking portion formed by the legs 14, which are flexible, to pass through the hole 10 in the PCB 12. FIG. 10 shows the radially inward compression of the flexible legs 14 so as to permit passage of the legs through the hole 10. Once the compressed slotted legs of the rivet staking portion pass through the hole 10, the resilient characteristic of the legs 14 enables them to expand outwardly so as to have a diameter greater than that of hole 10 and thus secure the PCB 12 firmly to the connector 2. The rivet itself may be made of various types of materials having a resilient characteristic, including any metal having the predetermined resilient characteristics, such as low carbon steel, brass and aluminum, or may be of a plastic material.

The shank 18 is illustrated as being unslotted but it is understood that a shank which has slots formed therein may also be possible to use. As illustrated, the abutment face of the head portion of the rivet is substantially flat so as to appropriately engage the upper surface of the connector 2.

With respect to the method of insertion of the rivet into the connector and the PCB so as to interconnect the same, the method includes the step of passing the rivet through the hole 4 in the connector so that the head portion 6 abuts the surface of the connector, drawing the mandrel 20 through the bore 16 and passing the legs 14 of the rivet through the hole in the PCB and radially outwardly expanding the legs so as to secure the PCB to the connector. If necessary, a force can be applied on the head portion of the rivet when passing the legs of the rivet through the hole in the PCB. For initially securing the rivet to the connector, the mandrel with the expanded head 21 is drawn through the bore so that the legs are 10 radially outwardly moved and thus secure the rivet to the connector. As illustrated, the mandrel has a maximum diameter which is greater than that of the bore 16 such that, upon drawing the mandrel through the bore, the outer diameter of the shank portion 18 is enlarged and tightly engages the wall of the hole 4 of the connector 2. As also illustrated, in passing the legs of the rivet through the hole in the PCB 12, the legs 14 are at first in a radially outwardly extended configuration as shown in FIG. 9, then are inwardly biased as shown in FIG. 10 and, after passing through the hole 10, expand outwardly due to the resilience of the legs so as to secure the PCB to the connector as illustrated in FIG. 11.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States:

1. A push-in rivet for being mounted on and interconnecting a connector and a board, which comprises:

a rivet body for being mounted on the connector, the rivet body having a head portion, a plurality of spaced-apart legs and a shank portion which interconnects said head portion and said legs wherein said legs are radially inwardly movable for passage through a hole formed in said board and radially outwardly movable after passage through said hole in said board so as to interconnect said connector and said board and wherein, prior to being mounted on the connector and the board, said legs are radially outwardly flared from said shank portion to a maximum diameter and are inwardly tapered from said maximum diameter to an end portion of said legs.

2. A rivet as claimed in claim 1, wherein said legs are slotted and said rivet directly engages said connector and board upon being mounted thereon.

3. A rivet as claimed in claim 1, wherein said rivet body has a bore which extends through said head portion, between opposite legs of said plurality of legs, and through said shank portion and wherein said shank portion comprises an unslotted shank.

4. A rivet as claimed in claim 1, wherein said rivet body comprises a flexible material selected from the group consisting of plastic and flexible metals.

5. A rivet as claimed in claim 1, wherein an abutment face of said head portion is substantially flat for engaging a surface portion of said connector.

6. A rivet as claimed in claim 1, wherein said legs have slots formed therebetween which extend substantially the entire length of each of said legs.

7. A rivet as claimed in claim 1, wherein said legs are radially outwardly expandable upon passage of a mandrel through said bore.

8. A rivet as claimed in claim 7, wherein mandrel has an outer diameter which is greater than that of said bore.

9. A rivet as claimed in claim 1, wherein said board comprises a printed circuit board.

\* \* \* \* \*